United States Patent [19]
Lux

[11] 4,190,861
[45] Feb. 26, 1980

[54] METHOD AND ARRANGEMENT FOR REDUNDANCY-REDUCING PICTURE CODING

[75] Inventor: Peter Lux, Hamburg, Fed. Rep. of Germany

[73] Assignee: U.S. Philips Corporation, New York, N.Y.

[21] Appl. No.: 829,894

[22] Filed: Sep. 1, 1977

[30] Foreign Application Priority Data

Sep. 7, 1976 [DE] Fed. Rep. of Germany ....... 2640140

[51] Int. Cl.² .............................................. H04N 7/12
[52] U.S. Cl. ..................................... 358/135; 358/138; 364/515
[58] Field of Search ................. 358/135, 138; 364/515

[56] References Cited

U.S. PATENT DOCUMENTS

| | | | |
|---|---|---|---|
| T928,003 | 11/1974 | Bahl | 358/135 |
| 2,905,756 | 9/1959 | Graham | 358/135 |
| 2,921,124 | 1/1960 | Graham | 358/138 |
| 3,521,241 | 7/1970 | Rumble | 358/135 |
| 3,524,926 | 8/1970 | Starr | 358/135 |

*Primary Examiner*—Howard W. Britton
*Attorney, Agent, or Firm*—Thomas A. Briody; Edward J. Connors, Jr.; Jack E. Haken

[57] ABSTRACT

With known methods for predictive decorrelation this decorrelation only applies to one or more previously scanned elements of the same picture line. In accordance with the invention a picture to be scanned is divided into sub-pictures wherein a number of picture lines equal to the number of lines comprised in a sub-picture is intermediately stored in shift registers, a processing circuit being connected to the last stages of these shift registers, which processing circuit multiplies the values of the picture elements of one sub-picture with the same number of coefficients stored in the processing device and which adds the products. In a preferred embodiment the difference values obtained in this manner are also decorrelated in a second stage, the matrix of the difference values being divided into difference value sub-pictures which are shifted, preferably diagonally, relative to the original sub-pictures. A considerably larger surrounding area of each picture element is thus involved in the prediction.

11 Claims, 7 Drawing Figures

METHOD AND ARRANGEMENT FOR REDUNDANCY-REDUCING PICTURE CODING

BACKGROUND OF THE INVENTION

1. Field of the Invention

The invention relates to a method of redundancy-reducing coding of the values of picture elements of pictures which are scanned line-by-line and which are distributed in a matrix into lines and picture elements, the difference value being formed for substantially each picture element between the actual value of the picture element and a predictive value obtained from the values of other picture elements, as well as to a digital circuit for implementing the method.

2. Description of the Prior Art

The redundancy reduction is effected by means of predictive decorrelation of picture elements. Such methods are, for example, disclosed in German published patent application No. 2312 526 and constitute a general form of DPCM (differential pulse code modulation). This enables a considerable data reduction without a significant loss in information when storing and transmitting pictures respectively. The known DPCM methods, however, have the drawback relative to other transformation methods that the prediction is performed, causally, that is to say during scanning the previously scanned value is involved in the prediction and the reconstruction relates each time to the values which have already been construed. The prediction itself cannot relate to the entire picture area but only the preceeding picture area which preceded during decorrelation with subsequently scanned picture elements is not known.

SUMMARY OF THE INVENTION

It is an object of the invention to provide a method with which the decorrelation of the picture elements and, consequently, redundancy reduction during the coding of pictures can be considerably improved. In accordance with the invention the picture matrix is divided into adjacent, equally large square subpictures, the values of the picture elements of the picture lines which are covered by a series of sub-pictures are intermediately stored, for a picture element the predictive value is obtained from the values of the other picture elements of the associated sub-picture and the resulting difference values are quantized. Because of the intermediate storage of picture elements it is possible, in this manner, to take the picture elements which are afterwards scanned, into account in the predictive decorrelation of the picture elements. Dividing the picture into sub-picture reduces the required storage capacity.

If higher demands are made on the decorrelation, the matrix of the difference values which corresponds to the picture matrix is divided into difference sub-pictures which are shifted, preferably diagonally, relative to the equally large sub-pictures of the picture matrix. Starting from the difference values of the difference sub-pictures second difference values are formed by forming the difference of each actual difference value relative to a predictive difference value obtained from the other difference values of the difference sub-picture and the second difference values are quantized. The decorrelation is performed in two stages, with special attention to the linear dependency of adjacent sub-pictures. Consequently, this decorrelation takes a considerably larger picture area into account and additional, intermediate storage is only required for a portion of the difference values.

A digit circuit arrangement for implementing the method according to the invention at least a number of picture element shift registers corresponding to the number of lines of the given sub-picture size are provided, each having a capacity equal to the picture elements in a picture line, which cyclically and successively store the signals of the picture elements of the picture, line-by-line. A first processing circuit for obtaining the difference values is connected to a number of the last elements of the picture-element shift registers; which number is equal to the number of lines. After all difference values of a sub-picture have been produced a clock-pulse control device supplies to the picture element shift registers a number of shift clock pulses equal to the number of lines of the sub-pictures.

The use of shift registers for picture storage devices results in simple control for storing the picture lines, as at the supply of the shift clock pulses with a number equal to the number of lines of the square sub-pictures, the values of a new sub-picture are supplied each time to the processing circuit. In an embodiment of this arrangement in accordance with the invention a number of difference value shift registers each having the capacity of a picture line plus at least half a sub-picture line are present, which number is equal to half the number of lines of the sub-pictures and, in the case of an odd number of lines to a, next smaller whole number, relative to half the number of lines). A part of the difference value outputs of the first processing circuit is connected to the inputs of the difference value shift registers and the remaining difference values outputs are connected partially through intermediate storage to inputs of a second processing circuit for obtaining second difference values. The last elements of the difference value shift registers which correspond to the picture element shift registers are connected to further inputs of the second processing circuit. The output of the second processing circuit which successively supplies the second difference values is connected to a non-linear quantizer. After the supply of all second difference values of a difference sub-picture the clock pulse control device supplies a number of shift clock pulses equal to the number of lines of the sub-pictures to the difference value shift registers and a transfer clock pulse to the intermediate storage and, then, a number of shift clock pulses equal to the number of lines of the sub-pictures to the picture element shift registers. Consequently not more than half the number of (picture element) shift registers is additionally required as difference value shift registers, while, more than double the picture area is taken into account in the prediction for each picture element.

BRIEF DESCRIPTION OF THE DRAWINGS

Embodiments of the invention will be explained below in greater detail with reference to the drawings in which:

FIG. 4a shows an example of the set-up of a processing arrangement;

FIG. 4b is a coefficient matrix which may have been stored in FIG. 4a;

FIG. 1 shows a portion of the picture matrix which is divided in equally large sub-pictures of 2×2 picture elements. First only the solid lines will be considered.

For the assumed size of the sub-pictures the picture lines on which the picture elements x11, x12 . . . are located, as well as the picture line on which the picture elements x21, x22 are located, are stored. From the values of the picture elements x12, x21 and x22 a prediction value is obtained for the picture element x11 which thus forms a probable value for the picture element x11; the difference with the actual value of the picture element x11 is determined and this difference is the first difference value for the picture element x11. In the same manner a prediction value is obtained for picture element x12 from the values of the picture elements x11, x21 and x22 etc. Four picture elements are processed, so that four difference values are produced which are indicated by x'11, x'12, x'21 and x'22. The obtension of the difference values can be expressed mathematically as follows:

$$[A]\cdot[x]=[x']$$

Figures 4A, 4B, 5B:
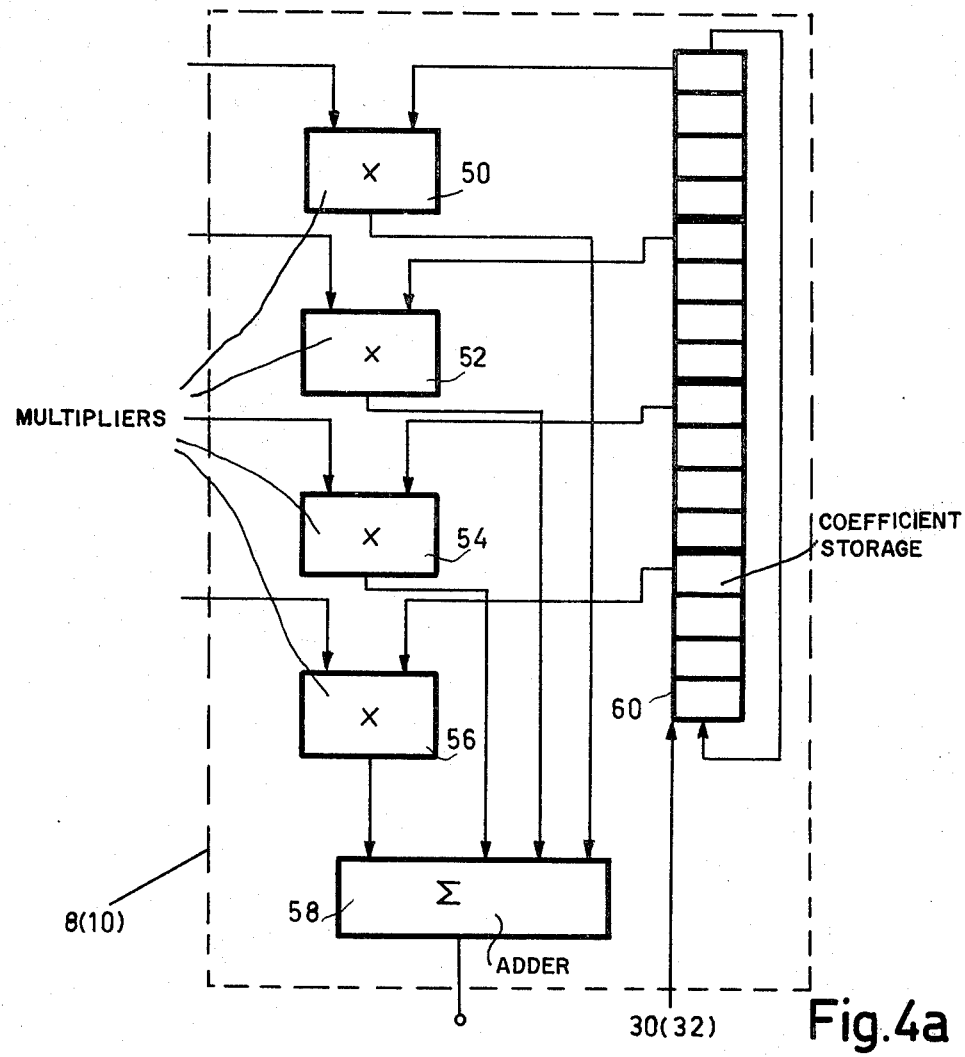

Herein [A] is the matrix of the prediction coefficients which can be determined so that the average square error is minimized. The prediction coefficients depend on the picture content, but, with only a slight reduction in the quality of the prediction, it is possible to start from uniform prediction coefficients for different pictures, if these pictures have substantially the same content, such as, for example, in the case of X-ray photographs. In addition, [x] and [x'] are the picture elements of the sub-picture and the difference sub-picture respectively which are accommodated in a column. By using the same correlation of the picture element values in the horizontal and the vertical direction as well as, in the direction of the main and auxiliary diagonal a Toeplitz matrix as shown in FIG. 5b is obtained. Herein the value 1 always takes the value of the picture element itself into account whereas the sum of the other coefficients, with the correct sign, takes the negative prediction values into account (also with the correct sign), so that the correct difference value is directly obtained by multiplying and adding. If, in addition, the same correlation is used for the diagonal direction ($-\xi$ in FIG. 5b) and in the horizontal and vertical direction ($-\xi$ in FIG. 5b) the decorrelation of the picture value indeed moves somewhat further away from the optimum value but a particularly simple implementation is then possible.

In principle a drawback of the difference formation is the fact that the absolute value, that is to say in the case in hand the average basic luminance of the sub-picture is lost if the sum of the prediction coefficients is equal to 1. If the sum of the coefficients deviates from the value 1 it indeed comprises the absolute value but then the redundancy reduction becomes worse: that is to say, the redundancy is again increased. This increase is less as the sum of the coefficients approaches the value 1, however the reconstruction then requires multiplications by large values, so that a corresponding error of the average picture luminance is unavoidable. A better possibility consists of using the matrix shown in FIG. 4b in place of the matrix shown in FIG. 5b. Here all coefficients in the first row of the matrix have the value 1 (of a lower positive number) the most important fact being that all coefficients have the same positive value. The first derived value, that is to say for the matrix shown in FIG. 1 the value derived for the picture element x11, then does not represent a decorrelated value but, rather, the average value of the picture luminance across the sub-picture x11, x12, x21 and x22. The remaining values are not changed. Consequently, the derived values of a sub-picture give in the coded form a longer code word, that is to say the redundancy reduction is not optimum, but instead they contain the average value.

The redundancy reduction can again be improved by transferring, the difference relative to the corresponding values of the preceding sub-picture and by transferring the absolute value only for the first sub-picture of a row of sub-pictures or for the first sub-picture itself (instead of the absolute values of the average picture luminances, that is to say the sum of the values of the four picture elements). However, by quantizing the derived values, a quantizing error is usually introduced which, with a chain of differences, may result in an error accumulation so that the last absolute value may have, on reconstruction, a very great deviation relative to the original absolute value. To prevent this the error a correction is introduced which compensates the quantizing error in that the difference is taken from the value which was already "falsified" by the quantizer instead of the actual preceding original value. This is a known principle in predictive decorrelation. Within a sub-picture itself such an error correction is, however, generally not necessary as long as the number of picture elements of a sub-picture is small (as in the relevant example for a 2×2 sub-picture).

With the method described sofar each sub-picture is only decorrelated per se, that is to say, independent of the adjacent elements and sub-pictures respectively. However, an ideal decorrelation must take, in the limiting case, the full picture into account for each picture element. By enlarging the sub-pictures it is possible to accomplish a very high approximation of this optimum decorrelation, but the cost and trouble for implementation are considerably increased. Three complete picture lines must then be stored for a sub-picture size of 3×3 picture elements, in addition, the matrices become correspondingly large so that multiplication and adding become considerably more expensive and more intricate to realize. Consequently, the following describes the possibility of accomplishing an improved decorrelation with less cost and trouble.

Figure 1:
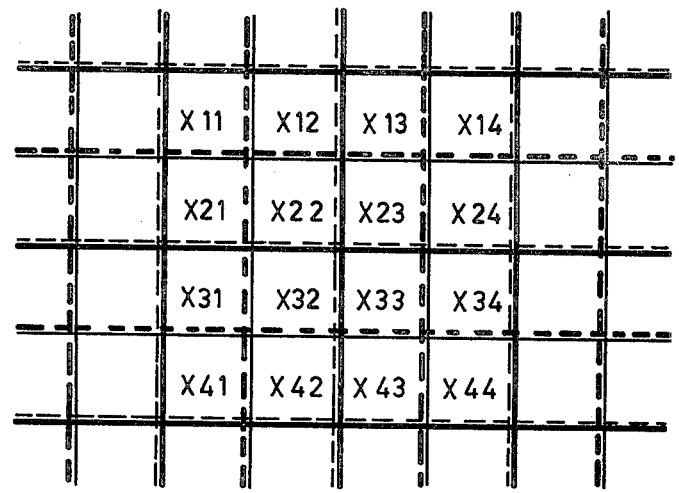
FIG. 1 shows a part of the picture matrix sub-divided into sub-pictures and difference sub-pictures.

To that end the derived difference values x'11, x'12 etc. are accommodated in accordance with the associated picture elements in a matrix and this matrix is also divided into sub-pictures having 2×2 difference values which, however, are shifted over one picture element relative to the sub-pictures of the picture matrix, namely in the diagonal direction. In FIG. 1 these difference sub-pictures are indicated by means of the heavy dashed lines. The difference value comprising these difference value sub-pictures are processed in fundamentally the same manner as the picture values in the sub-pictures. A considerably larger surrounding area is taken into account for each picture element. For example, the difference value x'22 is located in a difference value sub-picture which comprises the difference values x'22, x'23, x'32 and x'33 . These four difference values are used to form the second difference value $x''22$. However, the difference value $x'22$ comprises values of the picture elements $x11$, $x12$, $x21$ and $x22$. In a corresponding manner the values of the picture elements $x13$, $x14$, $x23$ and $x24$ are used in the difference value $x'23$. The difference values $x'32$ and $x'33$ also comprise a different sub-picture consisting of $2\times 2$ picture elements. Each of the four second difference values $x''22$, $x''23$, $x''32$ and $x''33$ consequently uses the picture values of four sub-pictures and the picture element value of a sub-picture cosisting of $4\times 4$ picture elements respectively. This applies in the same manner to the other second difference values which use other sub-pictures in a corresponding manner. This two-stage decorrelation, wherein a relatively large picture portion is used for each element, can be performed with considerably less cost and trouble then a one-stage decorrelation with correspondingly large sub-pictures as explained below with reference to FIG. 2. It should be noted that the fundamental set-up can also be used for large sub-pictures if the number of shift registers and multipliers in the processing circuits are extended in a corresponding manner.

Figure 2:
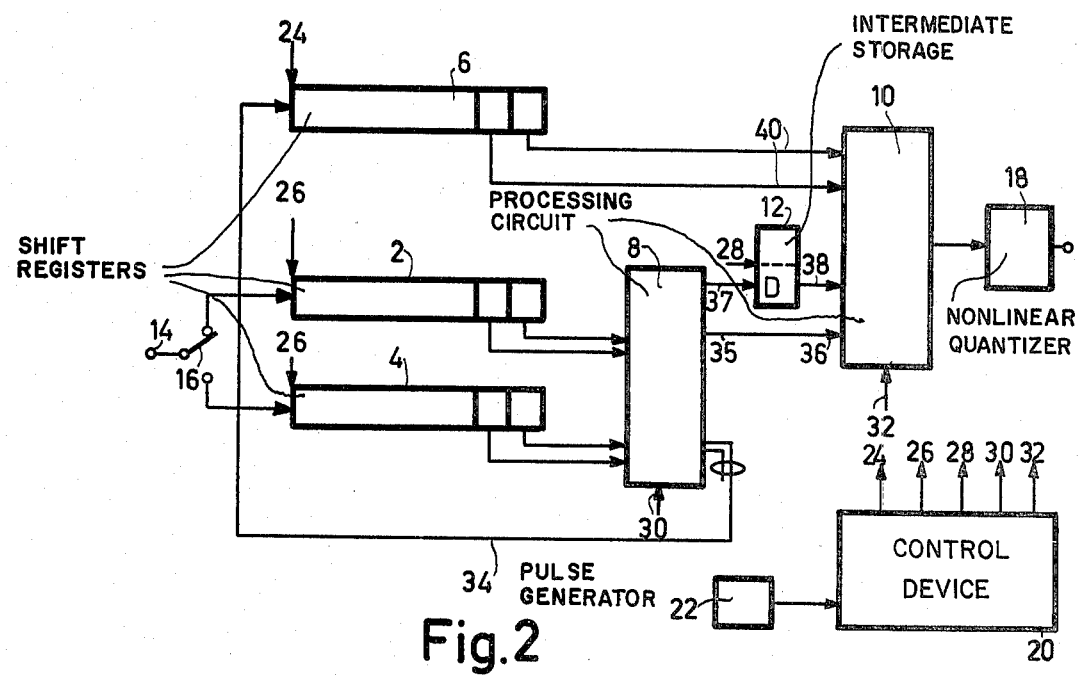
FIG. 2 shows a block diagram of an embodiment of a digital circuit arrangement according to the invention

FIG. 2 shows two shift registers 2 and 4 which each stores the values of a picture line. As the luminance value of each picture element is coded after scanning by an analog-to-digital converter (not shown), each stage of the shift registers 2 and 4 has a corresponding number of storage stages which transfer their contents, for example in parallel, to the corresponding storage stages of the adjacent shift register stage. For customary line-by-line picture scanning the coded picture element values are applied to an input 14 and enter successively through a switch 16 into the shift register 2, until a picture line has been fully scanned. Thereafter the switch 16 is switched-over and the coded values of the adjacent picture line, which are applied to the input 14 are entered into the shift register 4. The length of the two shift registers 2 and 4 is dimensioned such that each register can just store the values of one picture line. After storing two full picture lines the values of the first sub-picture are present in the last two stages of the two shift registers 2 and 4 and these stages are, consequently, connected to the inputs of a processing circuit 8. In this processing circuit the values of these four picture elements, which are present in parallel, are processed by means of a coefficient matrix, that is to say the picture values are multiplied by four different sets of coefficients and the products of each multiplication are added. A possible implementation of the processing circuit 8 is described below FIG. 4a (it is assumed for simplicity that the four difference values and derived values respectively, of the first sub-picture appear at separate outputs). The two bottommost outputs of these outputs are connected through leads 34 which are shown in the drawing as one line, to the input of a shift register 6. The output 37 of the two uppermost outputs 35 and 37 of the processing circuit 8 is connected through an intermediate storage 12 and the output 35 directly to the inputs 36 and 38 of a further processing circuit 10 which may be implemented in the same manner as the processing circuit 8. Two further inputs 40 of the processing circuit 10 are connected to the outputs of the last two stages of the shift register 6. The processing cicuit 10 supplies the second difference values, in this case to only one output, which may possibly be constituted by the output of a subsequent multiplexer in the case of parallel production of all second difference values. The second difference values are successively applied to a non-linear quantizer 18 whose output is, for example, connected to storage or to a transmission path.

The function of the circuit 10 will be further explained with reference to FIG. 1 when producing the second difference values $x''22$, $x''23$, $x''32$, $x''33$. First, the sub-pictures from the picture elements $x11$, $x12$, $x21$ and $x22$ (as well as from the picture elements $x13$, $x14$, $x23$ and $x24$) are successively processed. Since the values of the next row of sub-pictures, that is to say the sub-pictures consisting of the picture elements $x31$, $x32$, $x41$, $x42$ and from the picture elements $x33$, $x34$, $x43$, $x44$ are required for producing the second difference values of the above-mentioned difference value sub-picture. ($4\times 4$ picture matrix), the difference values $x'21$, $x'23$ etc. are first stored intermediately in the shift register 6. These values are thus present at the output of the shift register 6 when the values of the next two picture lines with the picture elements $x31$, $x32$ etc. as well as with the picture elements $x41$, $x42$ etc. are processed. It is now assumed that just the values of the picture elements $x31$, $x32$ and $x41$, $x42$ are present in the last two stages of the shift registers 2 and 4. Then the difference values $x'31$, $x'32$, $x'41$ and $x'42$ are produced at the output of the processing circuit 8. The difference value $x'31$ is processed at the preceding difference value sub-picture. Thus, for processing the next difference value sub-picture not only the difference values $x'22$, $x'23$, which are stored in the shift register 6 and the difference value $x'32$ present at the output of the processing circuit 8; but also the difference value $x'33$ which belongs to the sub-pictures $x33$, $x34$, $x43$, $x44$ whose values are present in the two stages before the last two stages of the shift registers 2 and 4 are necessary. These values can be brought into the last stages and applied to the inputs of the processing circuit 8 because the two shift registers 2 and 4 are supplied with two shift clock pulses via inputs 26. Before that, however, the other difference values of the preceding sub-pictures, which have not yet been processed into a difference value sub-picture should be stored. After all second difference values of the preceding difference values sub-picture have been completely produced the difference value $x'32$ is taken over by the intermediate store 12 which may comprise for example, D-flip-flops whose number is equal to the maximum number of bits of the difference value $x'32$. To that end, the bits of these difference values are supplied to the D-inputs of the flip-flops and a take-over clock pulse is supplied to a clock input 28 of all flip-flops. In addition, difference values $x'41$ and $x'42$ are taken over in the shift register 6 because two shift clock pulses are applied to this shift register through a shift clock input 24. If these difference values are transferred through the lead 34 in parallel with the shift register 6, a multiplexer must be included between these two leads and the series input of the shift register 6. The multiplexer successively scans the two inputs or the two lead informations are takenover in parallel with the first shift clock pulse in the two first stages of the shift register 6 and shifted one position at the second shift clock pulse. For the parallel production of the difference values this may be performed simultaneously with the information-transfer to the intermediate store 12. However, if the processing circuit 8 produces the difference values in series at an output in the natural sequence of the indices of the difference values, the transfer clock pulse 28 and the two shift clock pulses 24 are produced one after the other.

It should be noted in any case that the difference values x'22 and x'23 should be present at the outputs of the two last stages of the shift register 6, after the two shift clock pulses with which the difference values x'41 and x'42 are taken over. Thus the capacity of the shift register 6 should exceed the capacity of the shift registers 2 and 4, which precisely corresponds to one full picture line by at least half a sub-picture line.

After these difference values have been transferred the shift registers 2 and 4 are supplied with two shift clock pulses via the shift clock inputs 26 so that now the picture values x33, x34, x43 and x44 are connected to the inputs of the processing circuit 8. Consequently the processing circuit 10 receives: the difference value x'33 of the processing circuit 8, at the input 36 the temporarily stored difference value x'32 of the intermediate store 12 at the input 38; and the stored difference values x'22 and x'23 from the shift register 6 at the inputs 40, so that the second difference values of this difference value sub-picture can be produced. If the processing circuit 10 produces these second difference values in parallel they can be supplied via a multiplexer (included in the processing circuit 10) to the quantizer 18 if the latter can only successively process the second difference values. An other possibility is to store the parallel produced second difference values in parallel in a parallel-to-series converter in the form of a four-stage shift register and then supply them in series to the quantizer 18 while the transfer clock pulse 28, the shift clock pulses 24 and 26 being produced to prepare the adjacent difference value sub-picture. If, on the contrary, the processing circuit 10 successively supplies the difference values at the output, these pulses 24, 26 and 28 cannot be produced before all second difference values have been supplied to the quantizer 18. This cycle of processing stages is performed successively with all sub-pictures present in the shift registers 2 and 4 until the two picture lines are fully processed and these shift registers are empty. In this connection it should be noted that when shifting the information in the shift registers 2, 4 and 6 data appearing at the output of the shift registers may disappear as it is no longer needed.

Now the next two picture lines can be processed. With an arbitrary controllable scan two picture lines are then scanned one after the other and again entered into the shift registers 2 and 4. The first of the two picture lines can already be entered on processing the preceding two picture lines with the shift clock pulses which shift the data in the shift registers 2 and 4 during this processing to make better use of the time. With a continuous scanning at a fixed rate, as is usually the case with mechanical scanning devices, the two shift registers must be provided in two-fold and must be periodically switched-over, after two picture lines have been scanned.

As explained above, it is efficient not to decorrelate one of the values of the sub-pictures but to form the sum of all values of a sub-picture and to quantize the difference with the sum of the preceding sub-picture for obtaining the average luminance and the average absolute value respectively. For the two-stage processing described, this applies to both the sub-pictures and to the difference sub-pictures. Some additional measures are then required for correcting the error introduced by the quantizer, as shown in FIG. 3.

Figure 3:
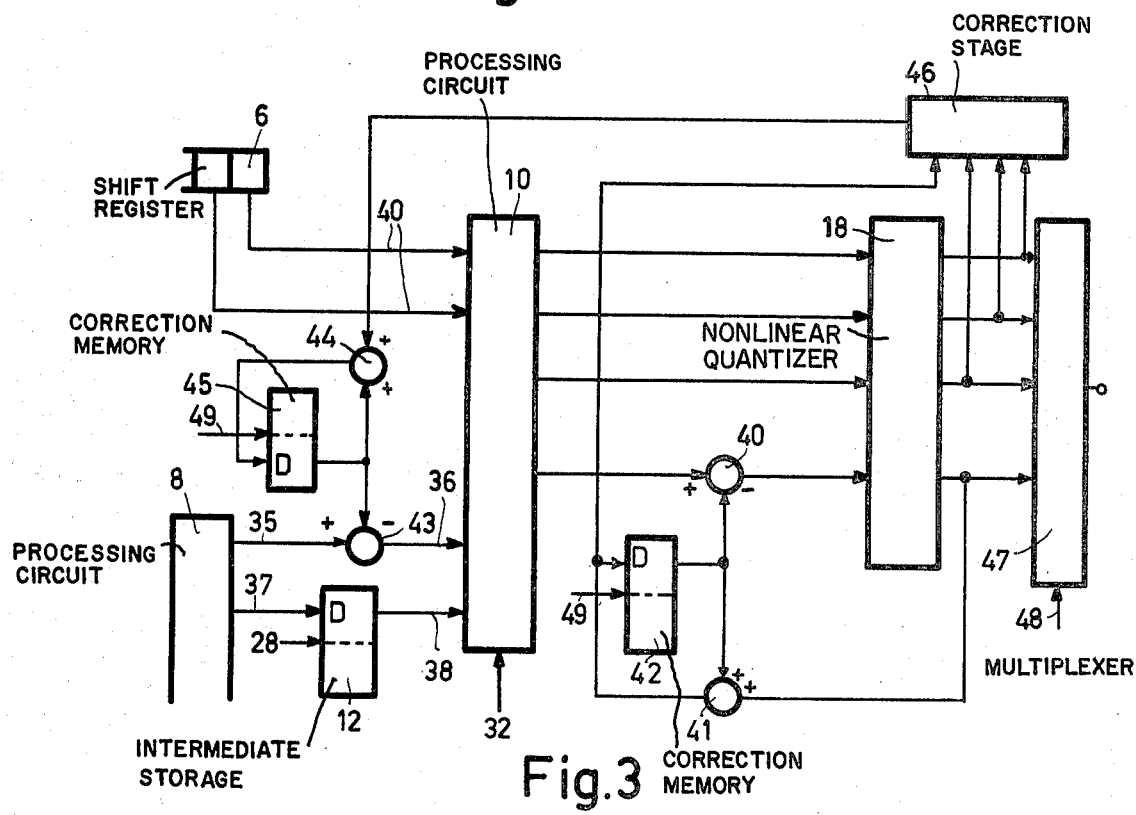
FIG. 3 shows a further embodiment of the digital circuit arrangement shown in FIG. 2.

Components corresponding with FIG. 2 have been given the same reference numerals in FIG. 3. Of the outputs of the processing circuit 8 only the two outputs 35 and 37, are indicated. By way of simplicity it is assumed in FIG. 3 that now the processing circuit 10 supplies the derived difference values at parallel outputs and that the quantizer 18 also comprises parallel inputs and outputs, the latter being converted into the necessary series form by a multiplexer 47 in the manner customary for the transmission or storage. It is furthermore assumed that in the processing circuit 8 the matrix of the coefficients is of the shape shown in FIG. 4b, whereas the coefficients matrix in the processing circuit 10 has the values 1 not in the first line but in the last line. Thus the point which contains the average value of the sub-picture invariably falls upon the same picture element for sub-pictures and difference sub-pictures. However, other set-ups of the coefficient matrix are also possible.

Referring to the above-described example the processing circuit 8 supplies at the output 35 the derived value x'33 which contains the average luminance of a sub-picture from the picture element x33, x34, x43 and x44. This value is supplied to the subtracting stage 43 from which value is subtracted a value for the average luminance from the preceding picture plus a correction value present in a correction memory 45. This correction memory 45 is shown here as a D-flip-flop; it actually consists, however, of a number of parallel flip-flops equal to the maximum number of bits for the derived values x'31, x'33 etc., taking the maximum correction value into account. The subtracting stage 43 is also dimensioned for a corresponding number of bits. The value supplied at the output 35 no longer appears at the input 36 of the second processing circuit 10 but the difference thereof with respect to the preceding value plus a correction value.

In the same manner the second derived value x"33 obtained from the bottommost output of the processing circuit 10 is not applied directly to the quantizer 18 but through a subtracting stage 40 in which the second derived value of the preceding difference sub-picture plus a correction value, which are present in a correction memory 42, are subtracted from this second derived value. The subtracting stage 40 as well as the correction memory 42 are also implemented in parallel for several bits. With reference to the example of the correction memory 42 it will be further explained that the correction memories 42 and 45 respectively contain precisely the value of the preceding sub-picture plus a correction value which corresponds to the error produced by the quantizer 18. At the output of the subtracting stage 40 a value appears which is the output of the correction memory 42 with a negative sign, together with the positive value supplied at the input (indicated by means of a + −sign) of the subtracting stage 40. As with the quantizer 18 each output value only depends on the associated initial value, because for example the average value of the value range in which the associated input value is located is supplied, the negative output value of the correction memory 42 on which the other input value of the subtracting stage 40 as well as the error produced by the quantizer 18 is linearly superimposed, appears at the right-hand input of the adder stage 41. As the output value of the correction memory 42 with the positive sign is supplied to the other input of the adder stage 41 this value disappears and at the output of the adder stage 41 the value present at the input (indicated by means of a + −sign) of the subtracting stage 40 plus the error given by the quantizer 18 as a correction value which, after termination of the processing of all output values of the quantizer 18 is transferred by a transfer clock pulse and the clock pulse input 49 of the correction memory 42, which erases the old contents. In this manner the error produced by the quantizer 18 is fully compensated by a following value so that no error accumulation can occur.

The same conditions apply in principle for the correction memory 45. The values at the input 36 of the processing circuit 10 (which values come from the subtracting stage 43) affect (by virtue of processing with the coefficient matrix) all four outputs of the processing circuit 10 and, also all four outputs of the quantizer 18. The value to be stored in the correction memory 45 of the preceding sub-picture plus the correction value in accordance with the error must be obtained by the quantizer 18 from all four outputs of the quantizer 18, which is done by means of a correction stage 46. The bottom output of the quantizer 18 is not immediately used for this purpose but instead the output of the adder stage 41 is supplied to the correction stage 46 to cancel the difference formation formed by the subtracting stage 40. Then, in the same manner as for the adder stage 41, the average value of the preceding sub-picture plus a correction value in which takes into account the error of the quantizer 18, at all four outputs, is produced at the output of the adder stage 44. The transfer clock pulse 49 for the correction memory 45 may be the same as that for the correction memory 42 so that they can be produced in common by the clock control device 20 shown in FIG. 2.

If in a practical embodiment a processing circuit 10 is used which successively produces the second derived values at a series-output, a series-to-parallel converter comprising a shift register can be disposed behind this series output; which results directly in the processing circuit 18 shown in FIG. 3, or the series output may be connected directly for the first three values to the series-input of the quantizer 18, which is then implemented in series form and for the fourth value by means of the switch-over switches through the subtracting stage 40 to the input of the quantizer 18. Then the quantizer 18 also has a series output as shown in FIG. 2, so that the multiplexer 47 is no longer necessary but then the stage 46 must be preceded by a series-to-parallel-converter if this stage needs all four values in parallel. The set-up of the stage 46 corresponds to that of the processing circuits 8 and 10; only one row of coefficients being present however, as only one value need be produced at the output.

The processing circuits 8 and 10 can be easily implemented in various manners as the values present at the four inputs need only be multiplied by four sets of coefficients and the products obtained must be added. The processing circuits 8 and 10 must thus comprise multipliers, adder stages and coefficient stores for multi-digit binary numbers, which are known in the art. As multipliers for multi-digit binary numbers are, however, expensive sofar the processing rate allows it is efficient to use the lowest possible number of amplifiers and to supply the output values serially.

An example of such a processing circuit 8 or 10 is shown in FIG. 4a. The circuit comprises four multipliers 50, 52, 54 and 56 for multi-digit binary numbers. The picture values to be processed and difference values respectively are supplied to one set of inputs. The other inputs of the multipliers are supplied with the coefficients from a storage 60, which is shown as a shift register. This shift register contains, for example, the coefficients of the matrix shown in FIG. 4b and that one after the other in a column. Consequently the coefficients of the first row of the matrix are simultaneously applied to the multipliers 50 to 56. The products at the outputs of the multipliers 50 to 56 are supplied to the adder 58 which then delivers, at its output, the first derived value of the sub-picture which is the average value for the matrix shown in FIG. 4b. Then a shift clock pulse is supplied to the shift register 60 through the input 30 and for the processing circuit 10 through the input 32 respectively by means of which the coefficients of the second matrix row are supplied to the multipliers 50 to 56. The shift register 60 is a closed circuit so that the information appearing at the end is again entered in the input and is not lost as the coefficients are used repeatedly. In this manner the processed, values successively appear at the output of the adder 58. When using a circuit of this construction as the processing circuit 8 in FIG. 2 the output leads shown there all start from one output and the distribution of the information is done by the proper sequence of transfer clock pulse and shift clock pulses which are produced in the clock control device 20 from the regular clock signals of a clock pulse generator 22, for example by means of counting circuits. The required sequence of signals will be apparent from the above description and is summarized again herebelow.

It is assumed that the values of a difference value sub-picture are present at the inputs 36, 38 and 40 of the processing circuit 10. Then a series of four shift clock pulses which are delivered at the output 32 of the clock control device 20 and supplied to the input 32 and, consequently, to the shift register 60 of the processing circuit 10 successively produce the second difference values and supply them to the quantizer 18. Thereafter the processing circuit 8 is supplied with four shift clock pulses which are delivered in the clock control device 20 at the output 30 and supplied to the input 30 of the processing circuit 8 and to the shift register 60 included therein. After the first pulse of these shift clock pulses the only output (shown in the example of FIG. 4a), delivers the second difference value which is taken over by virtue of a transfer clock pulse from the clock control device 20 at the input 28 of the intermediate storage 12. As the signals at the inputs 36, 38, 40 of the processing circuit 10 now change, it is assumed that the output thereof is cut-off. After the next two shift clock pulses at the input 30, the clock control device 20 supplies a shift clock pulse at the output 24, which shifts the contents of the shift register 6 over one stage each time. Thereafter the clock control device 20 supplies two shift clock pulses at the output 26 which transport to the last two stages in the shift registers 2 and 4. Additional shift to the last two stages. In addition, additional shift clock pulses at the inputs 30 and 32 must ensure that the contents of the shift registers 60 again assume the original position or the opposite direction by a corresponding number of shift clock pulses, or, if the shift register 60 has one direction of shift only, by supplying twelve additional shift clock pulses to complete a full cycle. This concludes a cycle of clock pulses and a new cycle can start.

Figure 5A:
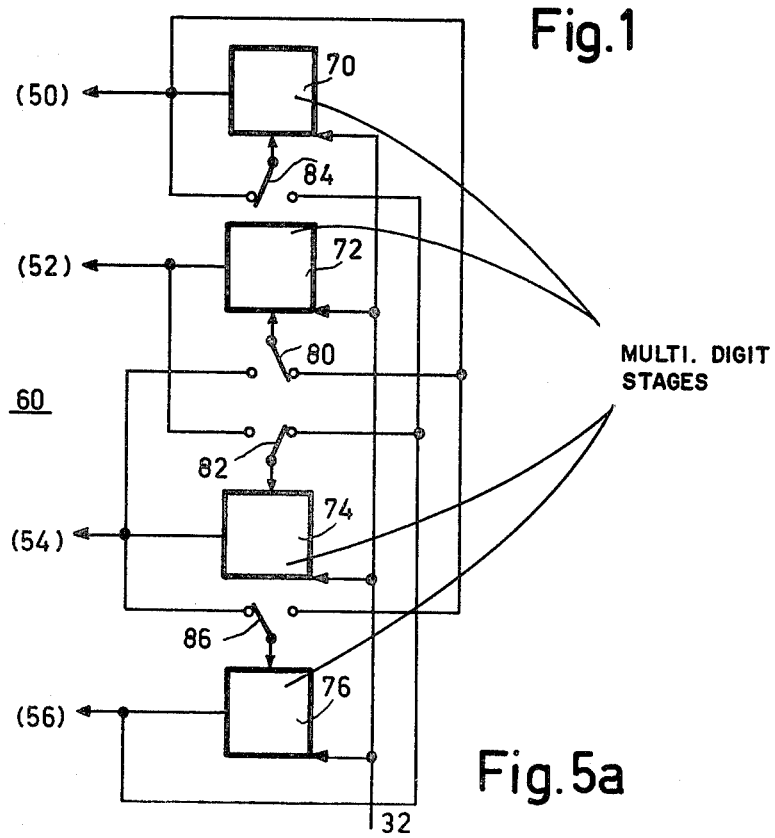
FIG. 5a shows a special embodiment of the coefficients storage in the processing circuit of FIG. 4a for a special form of the coefficients matrix and, FIG. 5b, is that matrix.

As the coefficients normally comprise multi-digit binary numbers, each shift register stage of the shift register 60 should comprise various storage stages. To reduce the cost and trouble for this shift register for given instructions for the coefficients in the matrix, as for example, shown in FIG. 5b, the shift register 60 may be implemented in the manner shown in FIG. 5a. Here the shift register 60 comprises only four stages 70, 72, 74 and 76 which each store a multi-digit binary word. First the coefficients are stored in the stages in the distribution shown in the first matrix line of FIG. 5b. In the position of switches 80, 82, 84 and 86 shown in the drawing, the stages contain the coefficients in the distribution shown in the second matrix line. Thereafter the switches 80, 82, 84 and 86 are switched to the opposite position and, after the second shift clock pulse at the input 32, the stages 70, 72, 74 and 76 contain the coefficients in the distribution shown in the third matrix line. Then the switches 80, 82, 84, and 86 are again switched to the position shown in the drawing and, after the third shift clock pulse at the input 32, the coefficients are distributed in accordance with the fourth matrix line. If, thereafter, the switches 80, 82, 84 and 86 are again switched to the opposite position the original distribution of the coefficients is attained again after the fourth shift clock pulse at the input 32. The switching signals for the switches 80, 82, 84 and 86 may also be produced by the clock control devices 20.

It should once again be noted that the coefficients in the processing circuits 8 and 10 can be changed during processing a picture, depending on the picture contents, however, for the entire picture or a category of pictures constant coefficients are much easier to realize and result in a decorrelation which is only very little poorer. Normally the coefficients in the processing circuit 10 will have different values than those in the processing circuit 8.

In known manner the quantizer 18 is used for coding the values supplied to it by means of a non-linear characteristic. Implementation and use of such a quantizer are known already and are not part of the invention.

A special feature occurs during processing the first and last two picture lines as well as at the beginning and at the end of all picture lines because in these positions a part of the values of the difference pictures are not present owing to the shift of these pictures with respect to the sub-pictures of the matrix. Here a picture value having an average luminance or a difference value zero may be assumed as a random initial value, or the edges of the picture having the width of a picture element are not processed into second difference values; that is to say, the difference value sub-pictures do not start until within the picture matrix. In both cases a given "falsification" of the picture edges is obtained in the reconstructed picture, however this slight falsification is only limited to a picture edge having the width of one picture element. For substantially all pictures this picture edge however, contains no essential information so that the slight falsification may be accepted.

The reconstruction or decoding of the pictures coded in this manner can, in principle, be performed in the same manner as the coding itself, that is to say the device shown in FIG. 2 can, in principle, also be used for the reconstruction of coded pictures. To that end a dequantizer is included before the input 14 which consequently cancels the influence of the quantizer 18 in the picture coding and reinstates the second difference values supplied by the processing circuit 10. These second difference values are then alternatingly entered into the shift registers 2 and 4 via the switch 16. Here, however, the values of a complete sub-picture appear successively; the shift registers 2 and 4 need thus comprise, in practice, only two stages. Only the shift register 6 must have the same length during decoding as during coding. In principle, also, the processing circuits 8 and 10 are of the same implementation for the reconstruction, while the coefficient matrices thereof need only contain the coefficients of the inverse matrices with respect to those used for coding. However, at the output of the processing circuit 10, the values of one original subpicture are supplied one after the other. If, however, the reconstructed picture must be displayed or printed line-by-line, two shift registers having the capacity of one picture line each which alternatingly and successively store the values of the sub-pictures must be connected to the output of the processing circuit 10 instead of the quantizer 18. These shift registers can then be read successively, in series.

What is claimed is

1. A method of redundancy-reducing coding of the values of picture elements of pictures which are scanned line-by-line and which are distributed in a matrix as lines and picture elements, a difference value being formed for substantially each picture element, said difference value being the difference between the actual value of the picture element and a predictive value obtained from the values of other picture elements, comprising the steps of:
dividing the picture matrix into adjacent, equally large, square sub-pictures;
intermediate storing the values of the picture elements of the picture lines which are covered by a series of sub-pictures;
obtaining the predictive value for a picture element from the values of the other picture elements of the associated sub-picture; and
quantizing the resulting first difference values.

2. A method as claimed in claim 1, wherein:
the matrix of the difference values which corresponds to the picture matrix is divided into difference sub-pictures which are shifted diagonally, relative to the equally large sub-pictures of the picture matrix;
starting from the difference values of the difference sub-pictures; second difference values are formed by forming the difference of each actual difference value relative to a predictive difference value obtained from the other difference values of the difference sub-picture; and
the second difference values are quantized.

3. A method as claimed in claim 2, wherein the first and the second difference values, respectively, are formed by multiplying the picture element values of the relevant sub-picture and difference-sub-picture, respectively, by a set of coefficients which is constant for the complete picture, the products being added subsequently.

4. A method as claimed in claim 3, wherein, for a single picture element of each sub-picture and/or difference sub-picture, a value is obtained which indicates the sum of the values of all picture elements of the sub-picture and of all difference values of a difference sub-picture respectively instead of the difference relative to a predictive value.

5. A method as claimed in claim 4, wherein for the single picture element only the difference between the value indicating the sum and the corresponding value of the preceding subpicture and the difference sub-picture respectively is quantized.

6. A method as claimed in claim 5, wherein the corresponding value of the preceding difference sub-picture is derived from the corresponding quantized output value and the corresponding value of the preceding sub-picture consisting of all quantized output values of the associated sub-picture and difference sub-picture respectively is reconstructed.

7. A digital circuit for redundancy-reducing coding of the values of picture elements of pictures which are scanned line-by-line and which are distributed in a matrix as lines and picture elements, a difference value being formed for substantially each picture element, said difference value being the difference between the actual value of the picture element and a predictive value obtained from the values of other picture elements, comprising:

at least a number of picture element shift registers means corresponding to the number of lines of the given sub-picture size, each having a capacity of the picture elements of a picture line, which cyclically and successively store the signals of the picture elements of the picture line-by-line;

a first processing means for obtaining the difference values connected to the number of the last elements of the picture element shift register means which number is equal to the number of lines; and wherein after all difference values of each sub-picture have been produced, a clock-pulse control device supplies to the picture element shift register means a number of shift clock pulses equal to the number of lines of the sub-pictures.

8. A digital circuit as claimed in claim 7, further comprising:

a number of difference value shift register means, each having a capacity of one picture plus at least half a subpicture line, which number is equal to half the number of lines of the sub-pictures and, in the case of an odd number of lines to a next smaller whole number;

intermediate storage means;

second processing means; and a non-linear quantizer; and wherein:

a part of the difference values from the first processing means is connected to inputs of the difference value shift register means and the remaining further difference values are connected partly through the intermediate storage means to inputs of the second processing means for obtaining second difference values;

the last elements of the difference value shift register means which correspond to the picture element shift register means being connected to further inputs of the second processing means, the output of the second processing means which successively supplied the second difference values being connected to the non-linear quantizer; and wherein after the supply of all second difference values of a difference sub-picture the clock-pulse control device supplies a number of shift clock pulses equal to the number of lines of the sub-picture to the difference value shift register means and a transfer clock pulse to the intermediate storage means and thereafter a number of shift clock pulses equal to the number of lines of the sub-pictures to the picture element shift register means.

9. A digital circuit as claimed in claim 7, wherein each processing circuit comprises storage means for storing first coefficient values and a plurality of multipliers connected to the storage means and to the inputs of the processing means; and for each group of the same number of multipliers as there are picture elements in a sub-picture, an adder circuit which adds, with the correct sign, the output values, supplied by the multipliers.

10. A digital circuit as claimed in claim 9, wherein: the storage means is a shift register, only one group of multipliers and only one adder circuit being present;

the multipliers are connected to elements of the shift register so that after each shift clock pulse a second pair of coefficient values is supplied to the multiplier whereby the adder circuit successively supplies the individual values of a sub-picture.

11. A digital circuit as claimed in claim 7 further comprising:

a subtractor stage;

an adder stage;

storage means;

a quantizer;

third processing means; and, wherein the processing means for supplying one of the output values contains equal stored coefficients;

the subtractor stage is disposed at the output of the processing means for these output values whose subtracting input is connected to the output of the storage means, which storage means is further connected to the input of the adder stage, an output of the adder stage being connected to the input of the associated storage means; and wherein the additional input of the adder stage is respectively connected to the relevant output of the quantizer and to the output of third processing means whose inputs are connected to a part of the outputs of the quantizer and to the outputs of that adder stage which is directly connected to an output of the quantizer and which reconstructs the corresponding output value of the first processing means.

* * * * *